Sept. 18, 1923.
O. W. POPE
1,468,414
EMERGENCY BRAKE LEVER
Filed Jan. 15, 1923
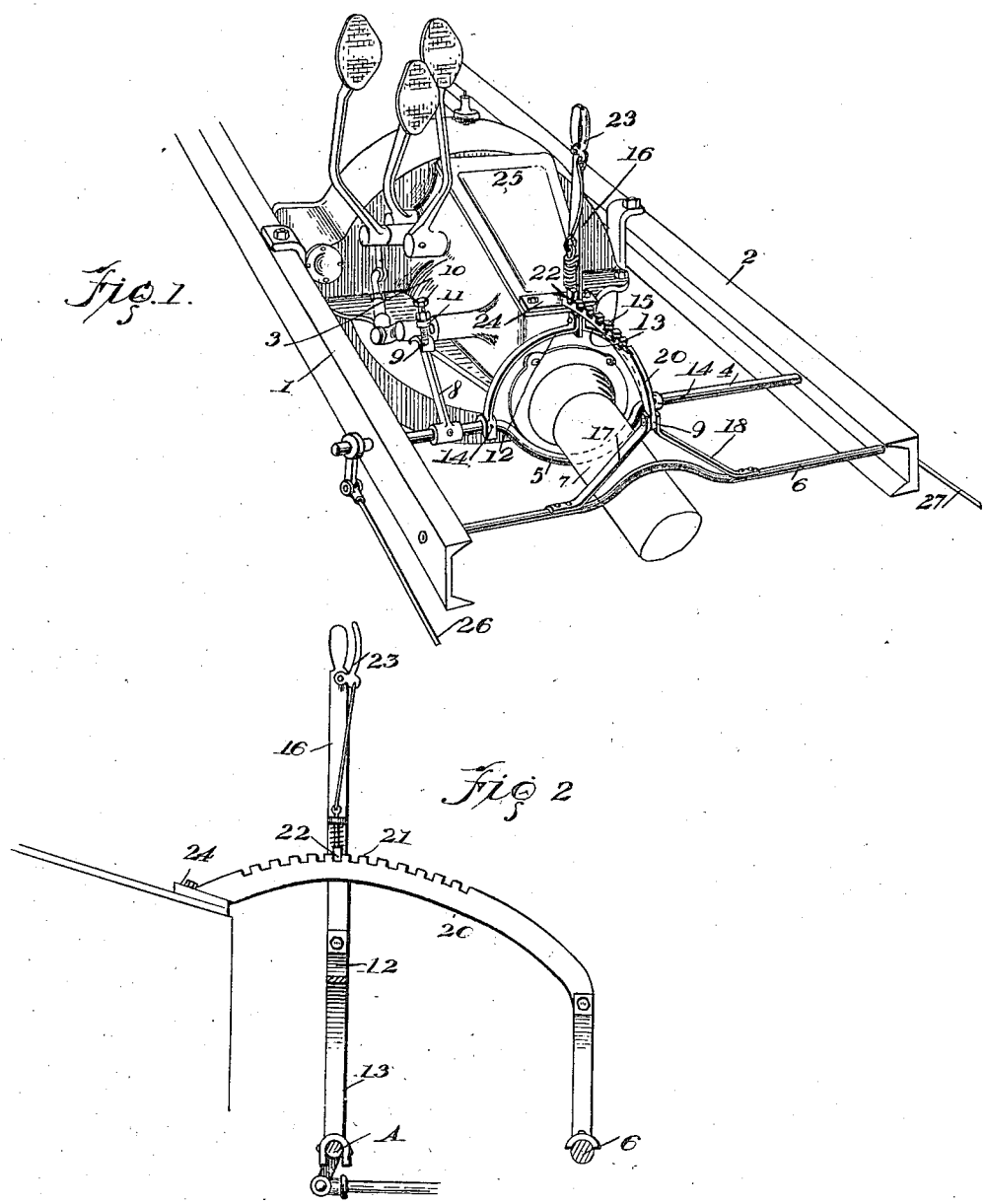

Patented Sept. 18, 1923.

1,468,414

UNITED STATES PATENT OFFICE.

OTTO WILLIAM POPE, OF OKLAHOMA, OKLAHOMA.

EMERGENCY BRAKE LEVER.

Application filed January 15, 1923. Serial No. 612,757.

*To all whom it may concern:*

Be it known that I, OTTO WILLIAM POPE, a citizen of the United States, and a resident of Oklahoma city, in the county of Oklahoma and State of Oklahoma, have invented certain new and useful Improvements in Emergency Brake Levers, of which the following is a specification.

This invention relates to improvements in emergency brake levers particularly adapted for the well-known Ford sedan.

An object of the invention is the provision of an emergency brake lever for Ford sedans which is adapted to be placed in a more convenient position for manipulation by the operator of a car.

A further object of the invention is the provision of a readily accessible emergency brake lever for applying the brakes to the rear wheels of a four door Ford sedan, a two door coupe and a Ford delivery car with the lever being so positioned that the same will not inconvenience the occupants of the front seats of the car, nor interfere with the operator of the car when entering or leaving the car.

Another object of the invention is the provision of an emergency brake lever which will be reliable and positive in its action for applying the brakes connected with the rear wheels of an automobile.

Other objects and advantages will become apparent during the course of the following description.

The invention is illustrated by way of example in the accompanying drawings, in which, Figure 1 is a fragmentary view in perspective of the chassis of an automobile supporting the transmission housing and showing my improved emergency brake lever applied substantially centrally of the transmission housing.

Figure 2 is a side view of the emergency brake lever and its operating parts.

Referring more particularly to the drawings, 1 and 2 designate the side channel members of the chassis of a Ford sedan in which is mounted the transmission housing 3. The brake shaft 4 is journalled at its ends in the beams 1 and 2 and is provided with a curved portion 5 spaced from the rear end of the housing and below the same.

A brace rod 6 rigidly connected at its opposite ends to the channel members 1 and 2 is spaced rearwardly of the brake shaft 4 and has a portion 6 curved over the top of the drive shaft housing 7.

The usual lever 8, which is rigidly connected at one end to the brake shaft 4, has at its upper end the usual arc-shaped cam member 9 engageable with the threaded lug 10. The lug 10 is mounted in an arm 11 connected with the high and low speed shaft which is usual in the well-known Ford construction.

A yoke comprising two members spans the upper face near the rear end of the transmission housing 3 and is rockable in spaced relation with said housing and in opposite directions with the curved portion 5 of the brake lever 4. Said yoke comprises two members 12 and 13 arcuate in shape with the member 12 provided at its lower end with a U-shaped member 14 rigidly pinned to the shaft 4 adjacent one end of the curved portion 5 of said shaft. The arcuate shaped member 13 is likewise provided with a U-shaped member 14 rigidly pinned to the shaft 4 adjacent the opposite end of the curved portion 5 of said shaft. The inner ends of the members 12 and 13 are provided with spaced ears 15 projecting upwardly from said members and adapted to embrace the lower end of an emergency brake lever 16 and to which said ears are rigidly secured. The U-shaped securing members 14 provide for ready application of the arms 12 and 13 to the brake lever 4 without the necessity of removing the brake lever for the purpose.

Straps 17 and 18 have their lower ends rigidly connected to the brace bar 6 and are angularly bent toward each other and provided at their upper ends with spaced ears 19 adapted to be secured to the rear end of a toothed ratchet bar 20. The teeth 21 of said ratchet bar are adapted to be engaged by a pawl 22 which is operated by an auxiliary spring pressed lever 23. The inner end of the toothed ratchet bar 20 is connected to a bar 24 which is secured to the rear end of the transmission cover plate 25 by the usual screws for securing said plate to the transmission housing 3.

The member 12 of the oscillating yoke is slightly longer than the member 13 so that the lever 16 will be positioned to the right of the longitudinal center line of the car in order to provide sufficient room for the operator's feet when the emergency brake lever 16 is moved to its forward position for release of the brake bands engageable with the rear wheels of the automobile. Likewise the strap 17 is slightly longer than the straps 18 whereby the toothed rachet bar 20 will be similarly disposed to one side of the center of the sedan. As usual in the Ford construction, rods 26 and 27 which are connected by bell crank levers to the brake shaft 4 extend rearwardly and connect with the brake bands that grip the rear wheels. The position of the lever 16 when connected directly to the brake shaft 4 and at the left end of said brake shaft is too closely associated with the inner wall of the sedan for ready manipulation by the operator of the car so much so that said wall interferes with the ready grasping of said lever when an emergency arises. The substantially central position of the lever 16 according to my invention provides a more accessible lever without interfering with the convenience of the occupants of the front seats of the sedan. Furthermore the position of the lever does not effect its usefulness in positioning the usual high and low speed gear shaft of the Ford construction since the arm 8 and the threaded stud 10 are retained for manipulating said shaft and throwing the gears into neutral when the lever 16 is set for applying the brakes and stopping the car.

In operation, the lever 16 is moved to its rearward position by release of the pawl 22 from the rachet bar 20 through the manipulation of the spring pressed lever 23. A release of the lever 23 causes the pawl 22 to lock the lever in position with the brakes applied. A reverse of this operation will permit the lever 16 to be moved forwardly releasing the brakes and permitting application of the low speed pedal or the reverse pedal when desired. Rocking of the lever 16 rocks the rigidly connected members 12 and 13 of the yoke and likewise the shaft 4 for shifting the rods 26 and 27 forwardly or rearwardly for respectively releasing or applying the brakes.

The simplicity of the structure and its connection with certain parts of the automobile permits ready access to the usual Ford parts when it is desired to remove or repair the same.

The straps 17 and 18 and ratchet bar 20 may be cast in one piece or formed separately as shown and constructed of malleable iron.

It is to be noted that brake lever and its appurtances may be formed as a single unit instead of a number of parts secured together.

While I have herein shown and described the preferred form of my invention, it is to be understood that various changes and modifications may be made herein without departing from the spirit of the invention or the spirit and scope of the appended claims.

What I claim is:

1. In combination with the chassis of an automobile supporting a transverse brake shaft, a brace rod and a transmission housing, a yoke comprising two members having their outer ends rigidly connected with the brake shaft upon opposite sides of the transmission housing, a brake lever rigidly secured to the inner adjacent end of the members of the yoke, a pair of straps having their outer ends rigidly connected in spaced relation to the brace rod, the straps being extended angularly toward each other and having their inner ends provided with ears spaced from each other, a toothed ratchet bar rigidly connected at one end between the spaced upper ends of the straps extended longitudinally forward of the transmission housing and connected at its opposite end to the cover plate of said housing, a spring pressed pawl mounted on said lever for operative engagement with the teeth of the ratchet bar for locking the lever in any one of a plurality of pre-determined positions, said ratchet bar being located parallel to the path of movement of said lever.

2. In combination with the chassis of an automobile supporting a transverse brake shaft, a brace rod and a transmission housing, a brake lever, means embracing the rear end of the transmission housing in spaced relation and connecting the brake lever to the transverse brake shaft, a toothed ratchet bar disposed longitudinally from the rear end of the transmission housing and in parallel relation with the movement of the brake lever, means connected with the brace rod for supporting the other end of the ratchet bar in spaced relation with the transmission housing, and means on the brake lever engageable with the ratchet bar for locking said lever in any one of a plurality of predetermined positions.

3. In combination with the chassis of an automobile supporting a transverse brake shaft, a brace rod and a transmission housing, a yoke mounted on the transverse brake shaft in spaced relation with the rear end of the transmission housing, a lever rigidly secured to the yoke whereby oscillation of the lever rocks the brake shaft, a V-shaped bracket rigidly connected with the brace rod, a toothed ratchet bar provided with a bar transversely mounted at one end, with said bar being connected to the transmission housing, the other end of the toothed ratchet bar being secured to the apex of the V-shaped bracket, said ratchet bar being disposed parallel to the path of oscillation of the brake lever, a spring pressed pawl engageable with the ratchet bar for locking the lever in any one of a plurality of predetermined positions.

OTTO WILLIAM POPE.